United States Patent
Coleman

(10) Patent No.: US 10,585,807 B2
(45) Date of Patent: *Mar. 10, 2020

(54) BALANCED CACHE FOR RECENTLY FREQUENTLY USED DATA

(71) Applicant: International Business Machines Corporation, Armonk, NY (US)

(72) Inventor: Andrew J. Coleman, Petersfield (GB)

(73) Assignee: International Business Machines Corporation, Armonk, NY (US)

(*) Notice: Subject to any disclaimer, the term of this patent is extended or adjusted under 35 U.S.C. 154(b) by 30 days.

This patent is subject to a terminal disclaimer.

(21) Appl. No.: 14/677,087

(22) Filed: Apr. 2, 2015

(65) Prior Publication Data

US 2016/0041926 A1    Feb. 11, 2016

Related U.S. Application Data

(63) Continuation of application No. 14/451,571, filed on Aug. 5, 2014.

(51) Int. Cl.
| | | |
|---|---|---|
| *G06F 12/122* | (2016.01) | |
| *G06F 12/0868* | (2016.01) | |
| *G06F 12/123* | (2016.01) | |

(52) U.S. Cl.
CPC ........ *G06F 12/122* (2013.01); *G06F 12/0868* (2013.01); *G06F 12/123* (2013.01); *G06F 2212/1016* (2013.01); *G06F 2212/1021* (2013.01); *G06F 2212/1041* (2013.01); *G06F 2212/281* (2013.01); *G06F 2212/313* (2013.01)

(58) Field of Classification Search
CPC ........... G06F 12/12; G06F 12/121–124; G06F 12/128; G06F 2212/69

USPC ...... 711/133–134, 136, 160, E12.069–0.073, 711/0.076

See application file for complete search history.

(56) References Cited

U.S. PATENT DOCUMENTS

| | | |
|---|---|---|
| 7,167,953 B2 | 1/2007 | Megiddo et al. |
| 7,457,920 B1 | 11/2008 | Kornegay et al. |
| 8,397,027 B2 | 3/2013 | Sivakumar et al. |

(Continued)

FOREIGN PATENT DOCUMENTS

| | | |
|---|---|---|
| CN | 103106153 A | 5/2013 |
| WO | 2013038220 A1 | 3/2013 |

OTHER PUBLICATIONS

Lee, D., Choi., J., Kim, J., Noh, S.H., Min, S.L., Cho, Y., and C.S. Kim, "LRFU: A Spectrum of Policies that Subsumes the Least Recently Used and Least Frequently Used Policies," IEEE Transactions on Computers, 2001, vol. 50, No. 12.*

(Continued)

*Primary Examiner* — Tracy A Warren
(74) *Attorney, Agent, or Firm* — Gilbert Harmon, Jr.

(57) ABSTRACT

The disclosure of the present invention presents a method and system for efficiently maintaining an object cache to a maximum size by number of entries, whilst providing a means of automatically removing cache entries when the cache attempts to grow beyond its maximum size. The method for choosing which entries should be removed provides for a balance between least recently used and least frequently used policies. A flush operation is invoked only when the cache size grows beyond the maximum size and removes a fixed percentage of entries in one pass.

15 Claims, 2 Drawing Sheets

(56) References Cited

U.S. PATENT DOCUMENTS

2008/0244181 A1* 10/2008 Walz ................ G06F 12/0864
711/121
2010/0281216 A1* 11/2010 Patel .................. G06F 12/121
711/118
2015/0350365 A1* 12/2015 Khakpour ............ G06N 7/005
709/213

OTHER PUBLICATIONS

Megiddo, N. and D.S. Modha (2003), "ARC: A Self-Tuning, Low Oeverhead Replacement Cache," UNIX File & Storage Technologies (FAST).*

Jenkov, J. "Java Concurrency: Read / Write Locks," Java Zone News, 2008, https://dzone.com/articles/java-concurrency-read-writ-lo.*

IBM Appendix P, list of IBM patents or patent applications treated as related, Apr. 2, 2015.

Megiddo et al., "Outperforming LRU with an Adaptive Replacement Cache Algorithm", Research Feature, Apr. 2004, pp. 4-11, IEEE Computer Society, © 2004 IEEE.

Odule et al., "Dynamically Self-Adjusting Cache Replacement Algorithm", International Journal of Future Generation Communication and Networking, vol. 6, No. 1, Feb. 2013, pp. 25-34.

"Cache algorithms", Wikipedia, the free encyclopedia, page last modified Mar. 20, 2014, <http://en.wikipedia.org/wiki/Cache_algorithms>.

"High Performance Cache With LRU Replacement Policy", An IP.com Prior Art Database Technical Disclosure, IPCOM000211159D, Jun. 12, 2010, pp. 1-19, Copyright 2010 Glenn Hofford.

"Method for LFU-LRU Cache Replacement Policy With Constant-Complexity", An IP.com Prior Art Database Technical Disclosure, IPCOM000211159D, Sep. 24, 2011, pp. 1-41, Copyright 2011 Crystal Li and Glenn Hofford.

Coleman, Andrew J., "Balanced Cache for Recently Frequently Used Data", U.S. Appl. No. 14/451,571, filed Aug. 5, 2014.

* cited by examiner

BALANCED CACHE FOR RECENTLY FREQUENTLY USED DATA

STATEMENT ON PRIOR DISCLOSURES BY AN INVENTOR

Various aspects of the present invention have been disclosed by, or on behalf of, an inventor or a joint inventor generally to the public in the product Integration Bus V.10 Open Beta, made publically available on Apr. 25, 2014.

The following disclosure(s) are submitted under 35 U.S.C. 102(b)(1)(A) as prior disclosures by, or on behalf of, a sole inventor of the present application or a joint inventor of the present application:

(i) IBM Integration Bus V.10 Open Beta Announcement (earliest availability date Apr. 25, 2014).

FIELD OF THE INVENTION

The present invention relates generally to the field of data processing, and more particularly to cache management.

BACKGROUND OF THE INVENTION

Caches are used to store data structures in an area of memory such that future access to that structure will be faster if the structure is found in the cache rather than having to re-calculate or re-load that structure from its original location. Because physical memory requires that a cache has a fixed, or upper bounded, size, the cache will probably get to the stage where it fills up. At that point, no more data can be stored unless data already contained within the cache is rejected.

Many types of algorithms exist to determine how this cache rejection is arranged, for example, least recently used (LRU), least frequently used (LFU), and least recently/frequently used (LRFU). LRU rejection policy requires a separate linked list to represent the recently used metric, and such list needs to be rearranged for every cache lookup in order to keep track of lookup order. LFU rejection policy rejects those objects first that are used least. An LRFU rejection policy combines an LRU rejection policy and an LFU rejection policy to eliminate the functional disadvantages of each.

SUMMARY

Embodiments of the present invention disclose a method, a computer program product, and a system for balancing a cache for recently frequently used data. A first computer system sets a first cache size and a second cache size for a cache memory. The first computer system identifies a current cache size of the cache memory. The first computer system responsive to the current cache size being at least the first cache size, removes one, or more, cache entries from the cache memory such that the cache memory has a new cache size. The first cache size is greater than the second cache size, and the new cache size is a size closer to the second cache size than the first cache size.

DETAILED DESCRIPTION

Figure 1:
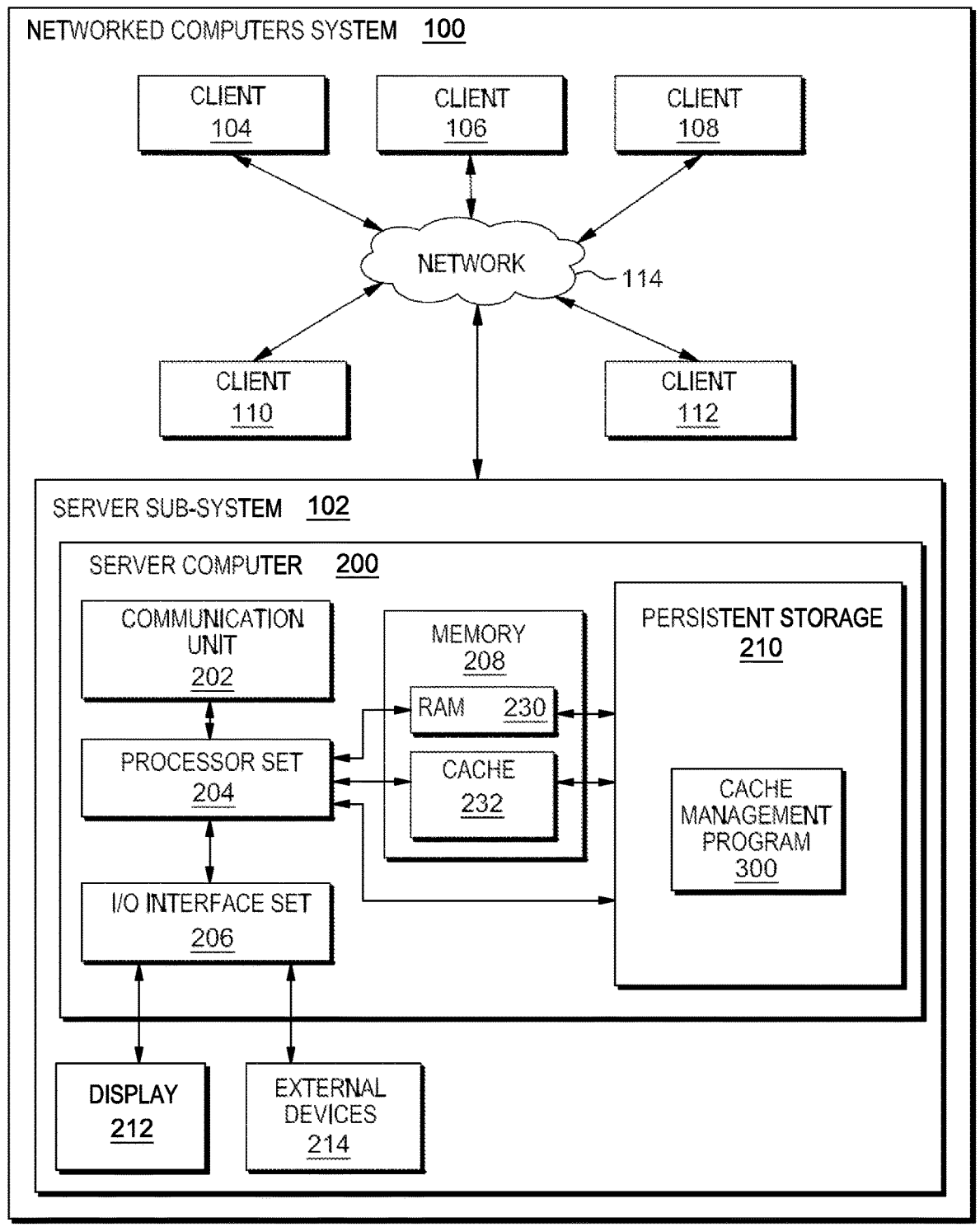
FIG. 1 is a schematic view of a first embodiment of a system according to the present invention.

Embodiments of the present invention provides for a stable balance between LFU and LRU policies without the performance penalties associated with locking or whole cache entry updates for each cache lookup. The capacity of the cache is allowed to vary between maximum and minimum sizes in order to support batch rejection rather than rejection for every new insert operation. This allows for higher average performance over the lifetime of the cache at the cost of occasional "stop and purge" rejection. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and cache management program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Cache management program 300 operates to efficiently maintain an object cache to a maximum size and provide a means of automatically removing a fixed percentage of cache entries when the cache attempts to grow beyond its maximum size. The program supports batch rejection of cache entries rather than rejection for every new insert operation. Entries to be removed from the cache are sorted in order of precedence level and the first fixed percentage of entries with the lowest precedence level are rejected from the cache memory.

Some embodiments of the present invention recognize the following facts, potential problems and/or potential areas for improvement with respect to the current state of the art: (i) least recently used (LRU) rejection policy requires a separate linked list to represent the recently used metric—this list needs to be rearranged for every cache lookup in order to keep track of lookup order, which hits performance and requires locking across multiple threads; (ii) LRU is also prone to single scans whereby and lots of objects are sequentially accessed once only there replacing the contents of the cache with objects that are never accessed again; (iii) in a server environment for least frequently used (LFU) rejection policy, objects that are accessed a huge number of times and subsequently not used again will remain in the cache for too long because of their large accumulated frequency count, even though they have not been accessed for a long time; (iv) in a server environment for LFU rejection policy, newer entries to the cache will never get the chance to accumulate an equivalent frequency count before they are rejected, even if they are being periodically accessed; and/or (v) many algorithms exist to combine LRU and LFU to eliminate the functional disadvantages of each, however, they still suffer performance issues on cache lookup because modifications have to be made to either the cache structures, or to every entry held within the cache.

The cache utilizes a hash-based associative array (i.e., hash map) as an in-memory data store. The hash map uses a hash function to assign keys to an array of slots from which a correct value associated with each key is found. The key and hash function are implementation-defined. The key includes, but is not limited to, (i) user name; (ii) home address; and/or (iii) phone number. In some embodiments of the present invention, the hash function assigns each key to a unique slot. In some embodiments of the present invention, the hash function assigns more than one key to a same slot. In some embodiments of the presentation, the hash function is independent of the slot number (i.e., array size). The hash function includes, but is not limited to, (i) a perfect hash function; (ii) separate chaining with list head cells; (iii) separate chaining with linked lists; (iv) separate chaining with other structures; (v) coalesced hashing; (vi) cuckoo hashing; and/or (vii) robin hood hashing.

The value associated with each array entry is a data structure that embeds the cached user object together with two counters, u and a, where u is the usage count of a cached object and a is the age count of a cached object. Each time there is a cache hit (i.e., lookup operation finds an entry), the entry's usage count u is increased, and its age count a is reset to zero signaling that the entry has been recently used.

The metric used to determine the precedence p of cache entries being removed from the cache during a flush operation when the cache size reaches a maximum size is $p=u-\beta^a$, where the base value, $\beta$, is a constant that represents the balance between LRU and LFU priority. Low values of $\beta$ (e.g., less than 2) favors LFU rejection; larger values of $\beta$ (e.g., greater than or equal to 10) provides a relatively dominant LRU behavior whilst still being resistant to a single scan of outliners wiping the entire contents of the cache. The base value may be any number including integers and rational numbers, for example, by choosing integers for the base value, embodiments of the present invention can be implemented using integer arithmetic. Some embodiments of the present invention pre-calculate the exponential age count component $\beta^a$ and store it in a lookup table for maximum performance.

Figure 2:
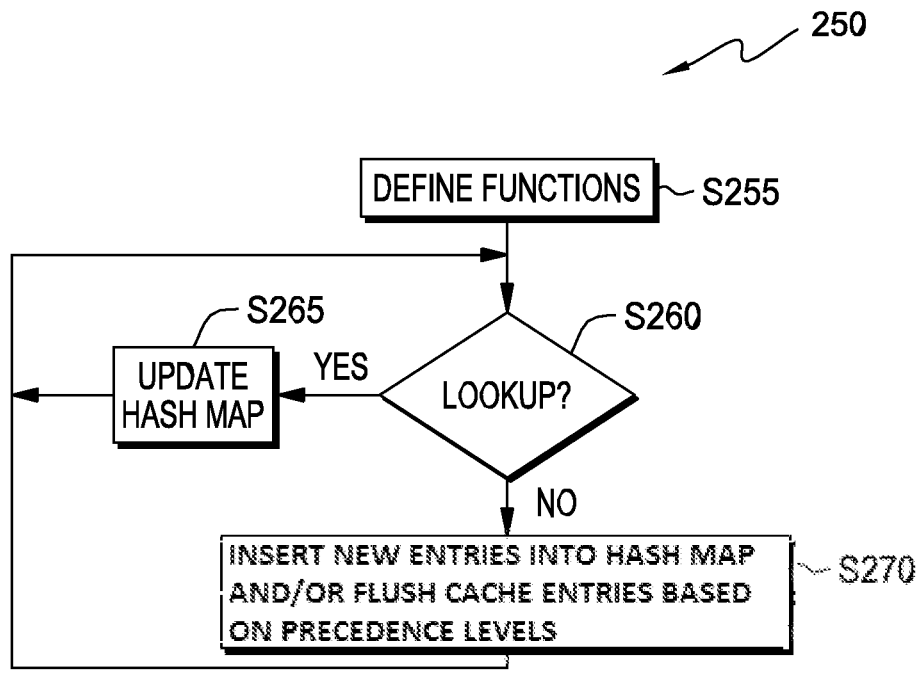
FIG. 2 is a flowchart showing a method performed, at least in part, by the first embodiment system.
Figure 3:
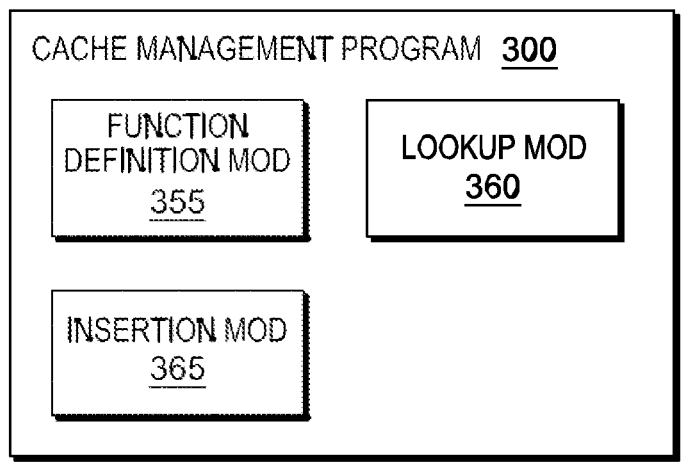
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where function definition module 355 defines the hash map, constants, and/or functions. In this example, the hash map is defined as a data structure according to the following pseudo-code:

```
cacheEntry {
    cachedObject
    useCount
    ageCount
}
HashMap key:cacheEntry
``` where useCount is usage count of cachedOject, and age-Count is age count of cachedObject.

The constants to be defined include: (i) a maximum cache size, "maxCacheSize" (e.g., maxCacheSize=10000); (ii) a minimum cache size, "purgedCacheSize" (e.g., purgedCacheSize=6000); and (iii) a base number, or value (e.g., $\beta=5$).

The defined functions include two external functions: lookup and insert, and one internal function: flush. In this example, these functions are described according to the following pseudo-code:

```
Function lookup (parameter: key) {
    acquire read lock
    lookup cacheEntry in HashMap (passing parameter: key)
    if cacheEntry exists
        increment useCount
        set ageCount = 0
        release read lock
    otherwise
        release read lock
        return nil
}
Function flush ( ) {
    create temporary array (size: currentCacheSize)
    populate the array with cache entries (key/value pairs) from
    HashMap
    sort the array-by increasing precedence (p = u - $\beta^a$)
    for each entry in array
        if currentCacheSize > purgedCacheSize
            //purges the cache of lowest priority entries
            remove from HashMap (passing parameter: key)
            de-allocate cacheEntry
        otherwise
            lookup from HashMap (passing parameter: key)
            increment ageCount in cacheEntry
    clear temporary array
}
Function insert (parameter: key, userObject) {
    acquire write lock
    if currentCacheSize >= maxCacheSize
        call flush ( )
    allocate new cacheEntry and initialize fields:
        cachedObject = userObject
        useCount = 1
        ageCount = 0
    insert into HashMap (passing parameter: key, cacheEntry)
    release write lock
}
```

Processing proceeds to step S260, where lookup module 360 decides whether or not an operation is a lookup operation. In this example, if the operation is determined to be a lookup operation, processing proceeds to the "Yes" branch, step S265. Further, if the operation is determined not to be a lookup operation, processing proceeds to the "No" branch, step S270. In some embodiments of the present invention, operations on cache memory include both lookup and insertion.

If "Yes" branch is selected, processing proceeds to step S265, where lookup module 360 calls the lookup function to find a desired entry in the hash map and update the hash map. In this example, the lookup function receives the requested key and acquires read lock. The lookup function further searches the requested key in the hash map. If the desired entry is obtained, the usage count of the desired entry is incremented and its age account is reset to zero, indicating the desired entry has been recently used, such that the hash map is updated. The lookup function further releases the read lock and returns the desired entry from the hash map. Alternatively, if the desired entry is determined not to be available in the hash map, the lookup operation releases the read lock and returns nothing from the hash map in response to the lookup request. In this example, once step S265 is completed, processing proceeds back to step S260. Alternatively, processing proceeds to end and waits for the next operation request.

If "No" branch is selected, processing proceeds to step S270, where insertion module 365 calls the insert function to insert new entries into the hash map. In this example, the insert function receives an entry to be inserted and acquires write lock. The insert function further determines whether or not the current cache size is beyond a predetermined maximum cache size. If the current cache size is greater than the predetermined maximum cache size, the insert function further calls the flush function to remove some existing entries from the cache to release some space for the new entries to be inserted. If the current cache size is determined not to reach the predefined maximum cache size, the new entry is allocated and initialized by, for example, setting its usage count as one and age count as zero. The insert function further inserts the new entry into the hash map and releases the write lock.

As discussed herein, when the flush function is called to remove some existing cache entries, the flush function creates a temporary array to populate with all the existing cache entries from the hash map. In the temporary array, the existing entries are sorted by, for example, increasing precedence p (i.e., lowest p first). During the flush operation, the flush function continues examining whether or not the remaining cache size is greater than the predefined minimum cache size (i.e., purgedCacheSize). If the remaining cache size is greater than the predefined minimum cache size, the existing entries with lowest precedence p are removed from the hash map until the remaining cache size is equal to or less than the predefined minimum cache size. The flush function further clears the temporary array upon completion of the flush operation. In this example, the age counts for the remaining entries that are not removed from the hash map are incremented.

In some embodiments of the present invention, for a cache that is filled with entries that are in constant use, the age count a remains very low and precedence is given to entries that have the highest usage count u. If a cache entry ceases to become accessed, then its age count increments each time the flush operation occurs increasing its chance of being removed. Regardless of how many times this entry had been used in the past (i.e., high usage count), the increasing age count renders very rapidly the entry redundant due to its exponential contributions by assuming the base $\beta$ being much greater than one (i.e., $\beta \gg 1$).

Some embodiments of the present invention fix predetermined values for the maximum and minimum cache sizes, for example, the maximum cache size may be set as 10000, and the minimum cache size may be set as 6000. Alternatively, these values are configurable by the user or corporate policy without any restrictions. Alternatively, these values are constrained by the hardware computer system or the software resource.

Some embodiments of the present invention, flush a fixed percentage of entries with lowest precedence during the flush operation. These flushed cache entries are removed from the cache. Such fixed percentage can be fixed, for example, as 40% of the current cache size prior to flush operation. Alternatively, the fixed percentage is configurable by a user, corporate policy, and/or the computer system resources. Alternatively, the fixed percentage may vary in a range, for example, from about 20% to about 50%.

In this example, once step S270 is completed, processing proceeds back to step S260. Alternatively, processing proceeds to end and waits for the next operation request.

Some embodiments of the present invention may include one, or more, of the following features, characteristics and/or advantages: (i) allow the cache to grow to a "maximum size", which then triggers a purge operation to reject many objects in one pass, such that the cache is reduced to a "minimum size"; (ii) allow inserts to be very fast and supports the ability to insert different objects at the same time from different threads of execution; (iii) require no write-lock; (iv) allow a user to configure the fixed percentage of the cache memory to be flushed without any restrictions; (v) suit for use in a long running program that requires repeated access at indeterminate intervals to an object or data structure that is computationally expensive to create but can be associated with a simple lookup key; (vi) benefit a short lived program that is constrained by limited memory (e.g., a mobile phone app); (vii) allow the capacity of a cache to vary between maximum and minimum sizes; (viii) support batch rejection rather than rejection for every new insert operation; (ix) allow for higher average performance over the lifetime of a cache at the cost of occasional "stop and purge" rejection; (x) require no whole cache entry updates for each cache lookup; and/or (xi) provide a stable balance between least recently used and least frequently used policies without the performance penalties.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for improving managing cache entries associated with a cache memory, the method comprising:
setting a first cache utilization size and a second cache utilization size for a cache memory;
identifying a current cache utilization size of the cache memory;
associating a precedence level of a set of precedence levels with each cache entry of a set of cache entries, wherein the set of precedence levels are determined according to the formula: $p=u-\beta^a$, where p is a precedence level, u is a usage count, $\alpha$ is an age count, and $\beta$ is a constant base value assigned according to a favored cache rejection policy and wherein the exponential age count component $\beta^a$ is pre-calculated and stored in a lookup table;
sorting the set of cache entries based on the set of precedence levels;
identifying among the sorted set of cache entries, a plurality of precedence levels;
selecting for removal a predetermined percentage of cache entries of the set of cache entries based on being associated with the plurality of precedence levels; and
responsive to the current cache utilization size being at least the first utilization cache size, removing one or more cache entries from the cache memory in a batch rejection such that the cache memory has a new cache utilization size;
wherein:
the first cache utilization size is a minimum size that the current cache utilization size reaches prior to removing the one or more cache entries from the cache memory;
the second cache utilization size is a maximum size that the new cache utilization size reaches after removing the one or more cache entries from the cache memory;
the first cache utilization size is greater than the second cache utilization size;
the new cache utilization size is a size closer to the second cache utilization size than the first cache utilization size; and
the one or more cache entries have a size equal to a pre-determined percentage of the current cache utilization size.

2. The method of claim 1, further comprising:
inserting a new cache entry into the cache memory.

3. The method of claim 1, wherein the first cache utilization size and the second cache utilization size are configured according to at least one of the following: user specification, corporate policy, or computer system.

4. The method of claim 1, wherein removing one or more cache entries from the cache memory includes sorting a set of cache entries according to the set of precedence levels.

5. The method of claim 4, further comprising:
responsive to a cache entry within the set of cache entries being looked up, the usage count corresponding to the cache entry being incremented, and the age count corresponding to the cache entry being reset to zero.

6. The method of claim 4, further comprising:
responsive to the cache memory having most of the cache entries within the set of cache entries in frequent use, a higher precedence level being assigned to a cache entry having the highest usage count.

7. The method of claim 4, further comprising:
incrementing the age count of an unaccessed cache entry each time the step of removing one, or more, cache entries from the cache memory is performed.

8. A method for improving managing cache entries associated with a cache memory, the method comprising:
setting a first cache utilization size and a second cache utilization size for a cache memory;
identifying a current cache utilization size of the cache memory;
associating a precedence level of a set of precedence levels with each cache entry of a set of cache entries;
sorting the set of cache entries based on the set of precedence levels;
identifying among the sorted set of cache entries, a plurality of precedence levels;
selecting for removal a predetermined percentage of cache entries of the set of cache entries based on being associated with the plurality of precedence levels; and
responsive to the current cache utilization size being at least the first cache utilization size, removing one or more cache entries from the cache memory in a batch rejection such that the cache memory has a new cache utilization size;
wherein:
the first cache utilization size is a minimum size that the current cache utilization size reaches prior to removing the one or more cache entries from the cache memory;
the second cache utilization size is a maximum size that the new cache utilization size reaches after removing the one or more cache entries from the cache memory;
the first cache utilization size is greater than the second cache utilization size;
the new cache utilization size is a size closer to the second cache utilization size than the first cache utilization size;
the one or more cache entries are included in a set of cache entries of the cache memory;
the set of cache entries are sorted according to the set of precedence levels; and
the set of precedence levels are determined according to the formula: $p=u-\beta^{\alpha}$, where p is a precedence level, u is a usage count, $\alpha$ is an age count, and $\beta$ is a constant base value assigned according to a favored cache rejection policy and wherein the exponential age count component $\beta^{\alpha}$ is pre-calculated and stored in a lookup table.

9. The method of claim 8, further comprising:
responsive to a cache entry within the set of cache entries being looked up, the usage count corresponding to the cache entry being incremented, and the age count corresponding to the cache entry being reset to zero.

10. The method of claim 8, further comprising:
responsive to the cache memory having most of the cache entries within the set of cache entries in frequent use, a higher precedence level being assigned to a cache entry having the highest usage count.

11. The method of claim 8, wherein $\beta$ has a value equal to ten for dominant LRU behavior.

12. The method of claim 8, wherein $\beta$ has a value equal to one to favor LFU-type cache rejection.

13. The method of claim 1, wherein associating a precedent level with each cache entry includes:
determining the usage count u for each cache entry, wherein the usage count u corresponds to a number of cache hits for the particular cache entry; and
retrieving the exponential age count component $\beta^{\alpha}$ for each cache entry from the lookup table; and
calculating the precedence level p using the determined usage count u and the retrieved exponential age count component $\beta^{\alpha}$.

14. The method of claim 8, further comprising:
defining a hash map;
determining that an operation is a lookup operation;
calling a lookup function to find a desired entry in the hash map in response to determining that the operation is a lookup operation, wherein finding the desired entry in the hash map includes:
receiving a requested key for the desired entry;
acquiring read lock; and
searching for the requested key in the hash map;
updating the hash map, in response to finding the desired entry in the hash map, by incrementing a usage count of the desired entry and resetting an age account of the desired entry to zero;
releasing the read lock; and
returning the desired entry from the hash map.

15. The method of claim 8, further comprising:
defining a hash map;
determining that an operation is not a lookup operation; and
inserting one or more entries in the hash map in response to determining that the operation is not a lookup operation by:
receiving an entry to be inserted into the hash map;
acquiring write lock over the hash map;
if the current cache utilization size does not exceed the first cache utilization size, allocating one or more cache lines for the received entry and initialize the received entry by setting its usage count and age count;
inserting the received entry in the hash map; and
releasing the write lock.

* * * * *